United States Patent
Kim et al.

(10) Patent No.: US 12,075,233 B2
(45) Date of Patent: Aug. 27, 2024

(54) SOUND FIELD CONTROL APPARATUS AND METHOD FOR THE SAME

(71) Applicant: LG ELECTRONICS INC., Seoul (KR)

(72) Inventors: Kihyun Kim, Seoul (KR); Donghoon Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 282 days.

(21) Appl. No.: 17/443,945

(22) Filed: Jul. 28, 2021

(65) Prior Publication Data
US 2022/0360935 A1 Nov. 10, 2022

(30) Foreign Application Priority Data
May 4, 2021 (WO) ................ PCT/KR2021/005632

(51) Int. Cl.
*G10L 15/22* (2006.01)
*H04S 7/00* (2006.01)

(52) U.S. Cl.
CPC ............. *H04S 7/305* (2013.01); *G10L 15/22* (2013.01); *H04S 7/303* (2013.01)

(58) Field of Classification Search
CPC ..... G10L 15/20; G10L 21/0208; H04S 7/305; H04S 7/303
USPC ........................................ 704/231, 233, 246
See application file for complete search history.

(56) References Cited

U.S. PATENT DOCUMENTS

| | | | |
|---|---|---|---|
| 9,107,021 B2 | 8/2015 | Florencio et al. | |
| 2011/0093262 A1* | 4/2011 | Wittke | G10K 11/17857 704/226 |
| 2017/0316773 A1 | 11/2017 | Walther et al. | |
| 2018/0240471 A1* | 8/2018 | Markovich Golan | G10L 21/0232 |
| 2018/0352334 A1 | 12/2018 | Family et al. | |
| 2019/0141449 A1 | 5/2019 | Barjatia et al. | |
| 2020/0228894 A1* | 7/2020 | Chen | H04R 1/406 |
| 2020/0314578 A1 | 10/2020 | Filos et al. | |

FOREIGN PATENT DOCUMENTS

| | | |
|---|---|---|
| JP | 2018506080 | 3/2018 |
| KR | 1020190052628 | 5/2019 |
| KR | 1020200015662 | 2/2020 |
| WO | 2021021857 | 2/2021 |

OTHER PUBLICATIONS

PCT International Application No. PCT/KR2021/005632, International Search Report dated Jan. 21, 2022, 10 pages.
European Patent Office Application Serial No. 21190928.8, Search Report dated Feb. 4, 2022, 7 pages.

* cited by examiner

*Primary Examiner* — George C Monikang
(74) *Attorney, Agent, or Firm* — LEE, HONG, DEGERMAN, KANG & WAIMEY (57) ABSTRACT

A sound field control apparatus includes a microphone configured to receive an utterance of a user, an output interface configured to output at least one of a sound signal and image data, and one or more processors configured to cancel a sound signal in a specific area around the microphone, obtain room impulse response information based on a user utterance position when the utterance of the user is received, and output a sound signal for providing an independent sound field to the user based on the room impulse response information.

7 Claims, 7 Drawing Sheets

SOUND FIELD CONTROL APPARATUS AND METHOD FOR THE SAME

CROSS-REFERENCE TO RELATED APPLICATIONS

Pursuant to 35 U.S.C. § 119 (a), this application claims the benefit of an earlier filing date and right of priority to International Application No. PCT/KR2021/005632 filed on May 4, 2021, the contents of which are hereby incorporated by reference herein in its entirety.

BACKGROUND

The present disclosure relates to a sound field control apparatus, and more particularly, to a sound device that provides a personalized sound field according to a user.

Recently, artificial intelligence assistants or voice assistants have emerged which use voice recognition technology, cloud, and artificial intelligence (AI) technologies to receive a voice of a user and perform a command corresponding to the received voice of the user.

As voice recognition became possible, voice-based platforms and the Internet of Things (IoT) have been established instead of a user's direct touch operation. Devices may be conveniently managed without using a user's hand, or actions intended by the user may be performed.

For example, an AI speaker capable of voice recognition may be connected to a display device installed in the home to output the sound of the device or control other home appliances. Also, an AI speaker may be provided in the form of a set-top box to provide various contents or applications.

On the other hand, a voice assistant that provides various contents or applications is commonly activated by a user's wake-up word. At this time, since noise is superimposed on a user's voice command by sound generated from an electronic device such as a TV, the user's voice command may not be accurately received.

Conventionally, in order to solve the above problem, it is necessary to reduce a volume of a TV when a wake-up word is received, or a user has to utter a wake-up word or an operation command with a loud voice.

Due to this, a sound field control apparatus capable of providing a sound field has appeared. However, there is a limitation to providing an optimal sound field effect of giving the best satisfaction to consumers by appropriately reflecting a spatial situation of an installation place, a taste of a consumer who consumes content in the space, and characteristics of the content to be reproduced.

SUMMARY

The present disclosure aims to control sound data generated from a speaker to be less transmitted to a location of a microphone, such that a sound field control apparatus capable of voice recognition can better receive a user's utterance regardless of other sounds.

The present disclosure aims to independently transmit, to a user, a response corresponding to a user's utterance by using a room impulse response (spatial impulse response) representing characteristics of a space in which a sound field control apparatus is located.

According to one embodiment of the present invention, a sound field control apparatus includes a microphone configured to receive an utterance of a user, an output interface configured to output at least one of a sound signal and image data, and one or more processors configured to cancel a sound signal in a specific area around the microphone, obtain room impulse response information based on a user utterance position when the utterance of the user is received, and output a sound signal for providing an independent sound field to the user based on the room impulse response information.

In addition, when the sound signal is canceled, the one or more processors may be configured to generate a specific sound signal, record the specific sound signal, and generate indirect sound information of the space by removing a direct sound of the specific sound signal from the recorded sound signal.

In addition, the one or more processors may be configured to generate the specific sound signal for each preset frequency band, and generate the indirect sound information of the space for each frequency band.

In addition, the one or more processors may be configured to generate the room impulse response information based on the characteristics of the space by synthesizing the indirect sound information generated for each frequency band.

In addition, the one or more processors may be configured to cancel the sound signal in the specific area around the microphone by filtering the room impulse response information and the direct sound of the sound signal output through the output interface.

In addition, the one or more processors may be configured to update the room impulse response information based on a degree of deformation of a previous user utterance signal and a current user utterance signal received by the microphone.

In addition, the one or more processors may be configured to extract a path, through which a sound signal is transmitted to the user, based on the room impulse response information, output a personal sound signal, an amplitude and a phase of which are changed to correspond to the path, and provide an independent sound field to the user.

In addition, the one or more processors may be configured to correct a damaged sound quality by using an acoustic spatial control (ASC) algorithm.

According to one embodiment of the present disclosure, an operating method of a sound field control apparatus includes canceling a sound signal in a specific area around a microphone, obtaining room impulse response information based on a user utterance position when an utterance of the user is received, and outputting a sound signal for providing an independent sound field to the user based on the room impulse response information.

The canceling of the sound signal in the specific area around the microphone may include generating a specific sound signal, recording the specific sound signal, and generating indirect sound information of the space by removing a direct sound of the specific sound signal from the recorded sound signal.

In addition, the canceling of the sound signal in the specific area around the microphone may include generating the specific sound signal for each preset frequency band, generating the indirect sound information of the space for each frequency band, and generating the room impulse response information, to which characteristics of the space are reflected, by synthesizing the indirect sound information generated for each frequency band.

In addition, the canceling of the sound signal in the specific area around the microphone may include canceling the sound signal in the specific area around the microphone by filtering the room impulse response information and the direct sound of the sound signal.

In addition, the obtaining of the room impulse response information based on the user utterance position when the utterance of the user is received may include updating the room impulse response information based on a degree of deformation of a previous user utterance signal and a current user utterance signal received by the microphone.

In addition, the outputting of the sound signal for providing the independent sound field to the user based on the room impulse response information may include extracting a path, through which a sound signal is transmitted to the user, based on the room impulse response information, outputting a personal sound signal, an amplitude and a phase of which are changed to correspond to the path, and providing an independent sound field to the user.

DETAILED DESCRIPTION OF THE EMBODIMENTS

Hereinafter, details of the present invention will be described.

An embodiment described below is only an example of the present invention, and the present invention can be deformed in various modes. Hence, specific configurations and functions disclosed below by no means limit the claims.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "interface" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Figure 1:
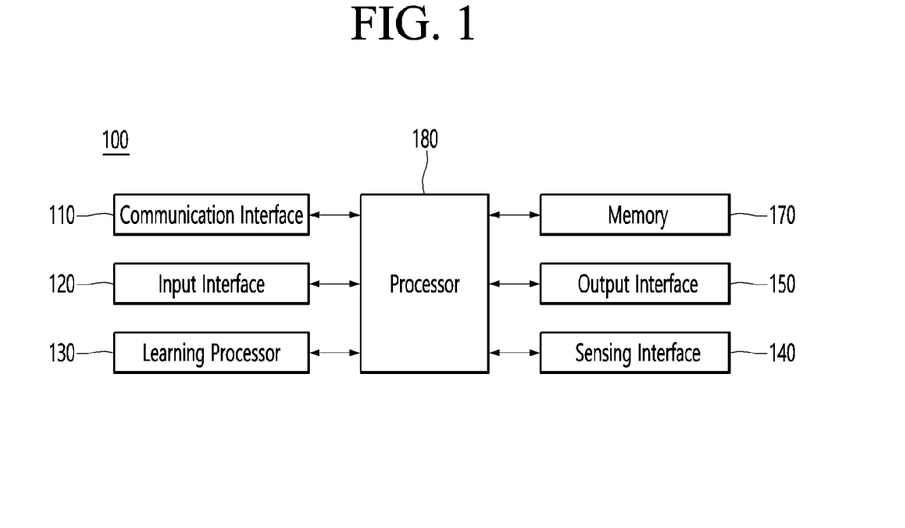
FIG. 1 illustrates a sound field control apparatus 100 according to an embodiment of the present disclosure.

FIG. 1 illustrates a sound field control apparatus 100 according to an embodiment of the present disclosure.

Hereinafter, the AI apparatus 100 may be referred to as a sound field control apparatus 100.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication interface 110, an input interface 120, a learning processor 130, a sensing interface 140, an output interface 150, a memory 170, and a processor 180.

The communication interface 110 may transmit and receive data to and from external devices such as other 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input interface 120 may acquire various kinds of data.

Here, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a training data for model learning and an input data to be used when an output is acquired by using learning model. The input interface 120 may acquire raw input data. Here, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing interface 140 may acquire at least one of internal information about the AI apparatus 100, ambient environment information about the AI apparatus 100, and user information by using various sensors.

Examples of the sensors included in the sensing interface 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

Here, the output interface 150 may include a display interface for outputting time information, a speaker for outputting auditory information, and a haptic module for outputting haptic information.

The memory 170 may store data that supports various functions of the AI apparatus 100. For example, the memory 170 may store input data acquired by the input interface 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
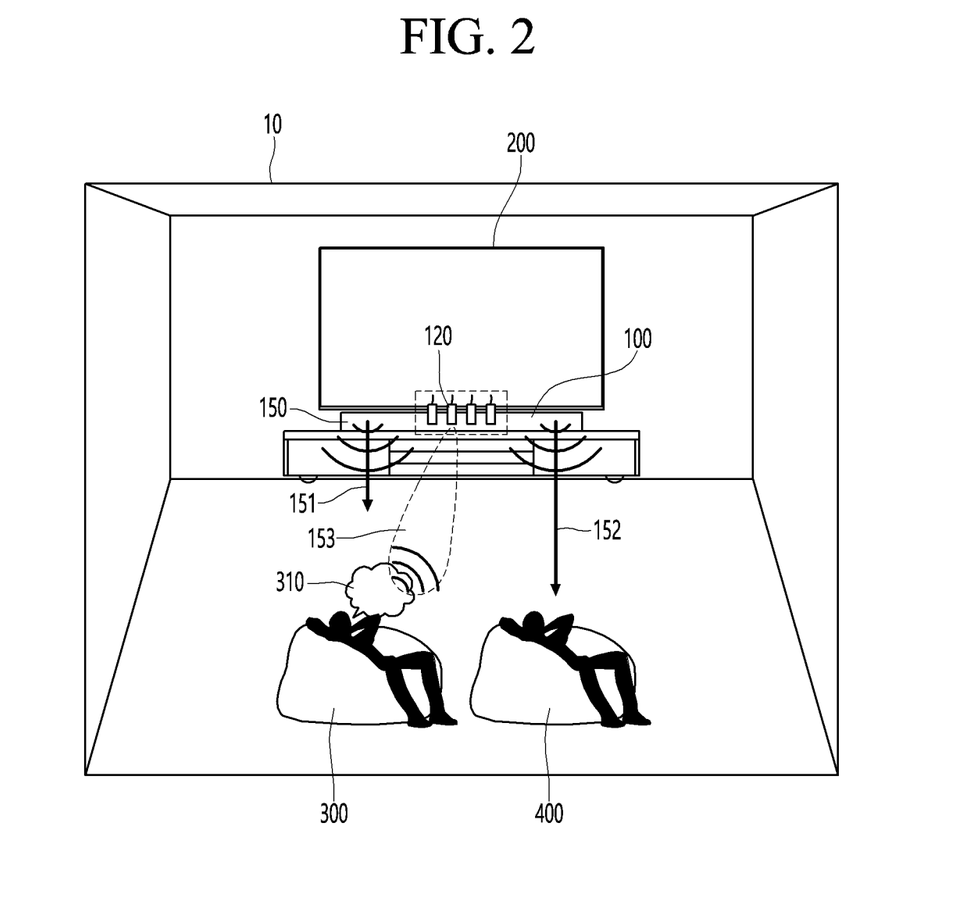
FIG. 2 is a diagram illustrating an example of a space in which a user and a sound field control apparatus are located, according to an embodiment of the present disclosure.

FIG. 2 is a diagram illustrating an example of a space in which a user and a sound field control apparatus are located, according to an embodiment of the present disclosure.

Referring to FIG. 2, a sound field control system according to an embodiment of the present disclosure may include a display device 200 and a sound field control apparatus 100 connected to the display device.

In this case, the sound field control apparatus 100 may include an output interface 150 and an input interface 120. The output module 150 may be a speaker configured with a speaker array, and the input interface 120 may be a microphone.

In addition, the output interface 150 may be installed in the outside as a separate device and connected to the sound field control apparatus 100.

On the other hand, the microphone is only an example of the input interface 120, and the input interface 120 may collect spatial characteristic information of a space in which the sound field control apparatus 100 is installed. Any apparatus may be used as long as the apparatus is capable of receiving a user's utterance.

Hereinafter, the operation scenario of the sound field control apparatus 100 according to an embodiment of the present disclosure will be described.

The display device 200 according to an embodiment of the present disclosure may be connected to the sound field control apparatus 100 to output applications or content.

Users 300 and 400 may sit at a specific location in a space and watch the display device 200.

That is, the example scenario of FIG. 2 is a case where a user watches the display device 200 such as a TV in a specific space 10 in the house.

Referring to FIG. 2, the user 300 may watch the display device 200 connected to the sound field control apparatus 100 in the space 10.

The sound field control apparatus 100 may receive a user's utterance 310 and perform a function corresponding to a user's utterance command.

At this time, various existing voice recognition algorithms may be used herein.

On the other hand, the sound field control apparatus 100 according to an embodiment of the present disclosure may output a sound signal 152 provided by the display device through the output interface 150.

Alternatively, the sound field control apparatus 100 may provide content and applications to the display device and output sound signals of the provided content and applications through the output interface 150.

On the other hand, the display device 200 may be provided as a separate electronic device. Unlike shown in FIG. 2, the display device may be provided in the sound field control apparatus 100 itself to output image content through the output interface 150.

In addition, although the output interface 150 of FIG. 2 is shown as a separate sound bar-type speaker array, the present disclosure is not limited thereto. The output interface 150 may be provided inside the sound field control apparatus 100, and may be provided as a separate speaker connected to a voice support device.

According to an embodiment of the present disclosure, the first user 300 and the second user 400 may hear the sound signal 152 output from the output interface 150 of the sound field control apparatus 100 connected to the display device 200 while watching an image output from the display device 200 disposed in the space 10.

In this case, the first user 300 may utter a wake-up word and a specific command 310 so as to communicate with the sound field control apparatus 100.

The microphone 120 of the sound field control apparatus may receive the wake-up word of the first user 300 and provide the first user 300 with a response 151 to the utterance of the user 300 through the output interface 150.

In addition, at the same time, the processor of the sound field control apparatus may provide the second user 400 with voice data 152 for the content being viewed.

Specifically, since the output interface 150 may be provided with a plurality of speaker arrays, some speaker arrays among the plurality of speaker arrays may provide the first user 300 with an independent sound field for the response 151 to the utterance of the user, and other speaker arrays may provide the second user 300 with the voice data 152 for the content being viewed.

As such, the independent sound field may be individually provided to the user by using the room impulse response.

Hereinafter, a method for providing an independent sound field will be described in detail.

On the other hand, as described above, the above is only an example, and the output interface 150 of the sound field control apparatus 10 may output both the image and the sound data.

Figure 3:
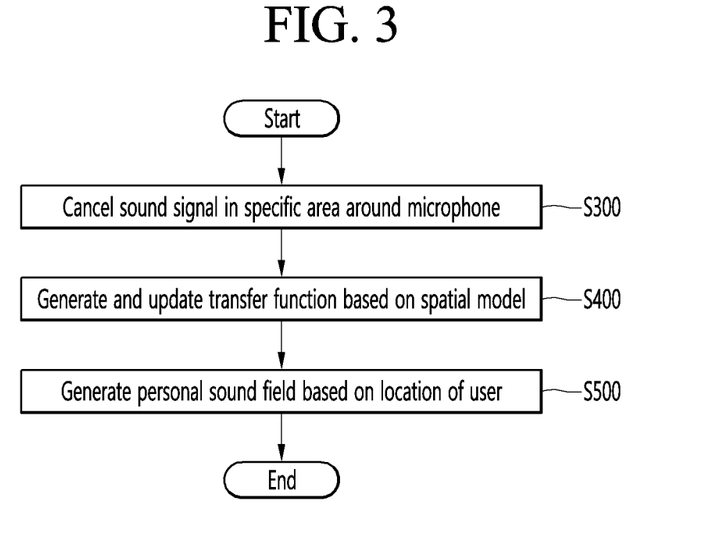
FIG. 3 is a flowchart according to an embodiment of the present disclosure.

FIG. 3 is a flowchart illustrating the operation of the sound field control apparatus according to an embodiment of the present disclosure.

First, the processor 180 of the sound field control apparatus 100 may cancel the sound signal received in a specific area around the microphone in order to accurately receive the utterance of the user regardless of the sound signal output from the output interface 150 (S300).

After operation S300, since the sound signal output from the output interface 150 is canceled at the location of the microphone provided in the sound field control apparatus 100, the utterance of the user may be accurately received without noise.

Subsequently, operation S300 will be described in detail with reference to FIG. 4.

The processor 180 of the sound field control apparatus 100 according to an embodiment of the present disclosure has to receive a user utterance command and output a sound signal for responding to the user utterance command through the output interface 150.

In this case, in order to provide an independent sound field to the user, the processor 180 has to determine a location where the user is located on a space formed in a room in the home.

To this end, the processor 180 according to an embodiment of the present disclosure may generate spatial location information about the location where the user is located.

In this case, the spatial location information may be filter information generated based on the room impulse response.

First, the impulse response may refer to an output that is output when an impulse is input to an input of a system. In general, Laplace transform of the impulse response is defined as a transfer function.

The room impulse response is signal response filter information generated based on the characteristics of the space where the user and the sound field control apparatus 100 are located. Since the room impulse response includes indirect sound information generated based on a reverb reflection sound or the like reflected from the space, the room impulse response may include the spatial characteristics.

A signal passing through the room impulse response filter may be converted into a signal reflecting the characteristics of the space where the user is located.

When the previously generated spatial location information exists, the processor 180 according to an embodiment of the present disclosure may update the spatial location information based on the current user utterance position (S400). Therefore, the room impulse response filter may also be updated.

Operation S400 will be described later with reference to FIG. 5.

After the spatial location information is updated based on the location of the user in operation S400, the processor 180 according to an embodiment of the present disclosure may output a sound signal for providing an independent sound field to the user (S500).

For example, when there are multiple users, an independent sound field may be individually implemented for each user, and sound data to be provided to each user may be transmitted.

Figure 6:
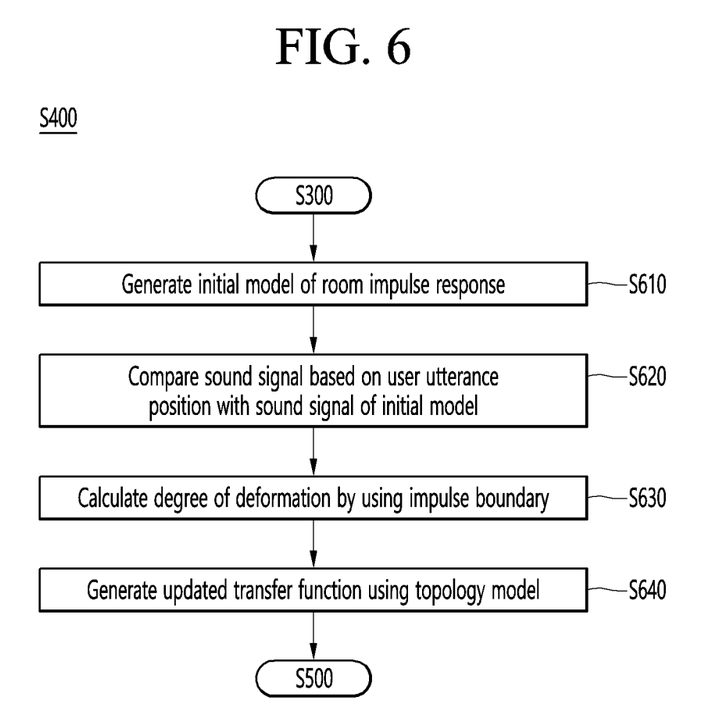
FIG. 6 is a flowchart according to an embodiment of the present disclosure.

Operation S500 will be described in detail with reference to FIG. 6.

Hereinafter, operation S300 will be described with reference to FIG. 4.

Figure 4:
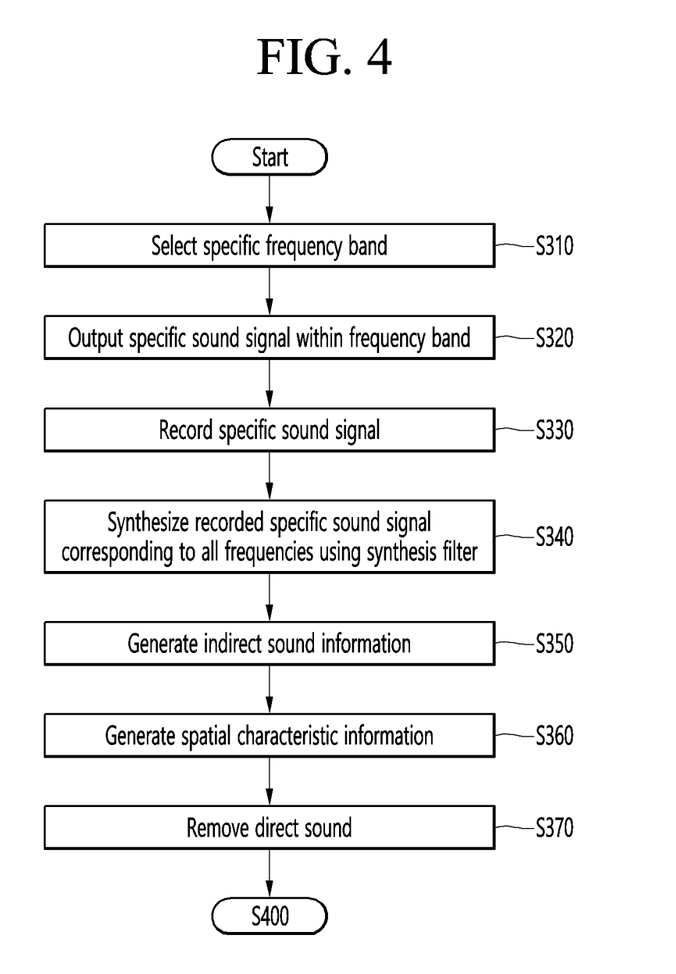
FIG. 4 is a flowchart according to an embodiment of the present disclosure.

FIG. 4 is a flowchart illustrating canceling a sound signal for a specific area around a microphone (S300), according to an embodiment of the present disclosure.

Conventionally, when the utterance of the user is detected, the volume of the display device is reduced in order to accurately receive the utterance of the user, or the volume is reduced by controlling an external speaker or an output interface of a voice assistant device.

Alternatively, noise canceling may be performed to remove direct sound by receiving reference data of the sound signal output from the sound output device and removing the reference data. However, the noise canceling method still had a problem in that the indirect sound reflecting the characteristics of the space could not be removed.

Referring to FIG. 4, the processor 180 according to an embodiment of the present disclosure may select a specific frequency band in order to cancel a sound signal in a specific area around a microphone (S310).

In this case, the frequency band may mean that the entire frequency is divided by a specific interval in order to generate a synthesis filter for canceling a sound signal.

The processor according to an embodiment of the present disclosure may select a first frequency band from a specific frequency band and output a specific sound signal within the frequency band (S320). In addition, the generated specific sound signal may be recorded (S330).

The processor 180 may synthesize the recorded specific sound signal by using a synthesis filter (S340).

In this case, the synthesized specific sound signal may represent a sound signal in which sound signals corresponding to all frequencies are recorded.

Thereafter, the processor may generate indirect sound information of the space by removing direct signal data from the synthesized specific sound signal (S350).

The processor according to an embodiment of the present disclosure may generate spatial characteristic information reflecting the characteristics of the space based on the indirect sound information of the space (S360).

This process may be referred to as extracting (estimating) indirect sound information.

Specifically, a filter may be generated by performing the above process for each frequency band and synthesizing respective indirect signal data. The room impulse response filter may be a filter in which the characteristics of the space where the user and the sound field control apparatus are located are considered.

Thereafter, the processor 180 may store the total room impulse response filter in a memory 170.

In addition, the processor 180 may cancel the sound signal in the specific area around the microphone by filtering the spatial characteristic information and the direct sound of the sound signal output through the output interface (S370).

On the other hand, the concept of the direct sound and the indirect sound will be described with reference to FIG. 5.

Figure 5:
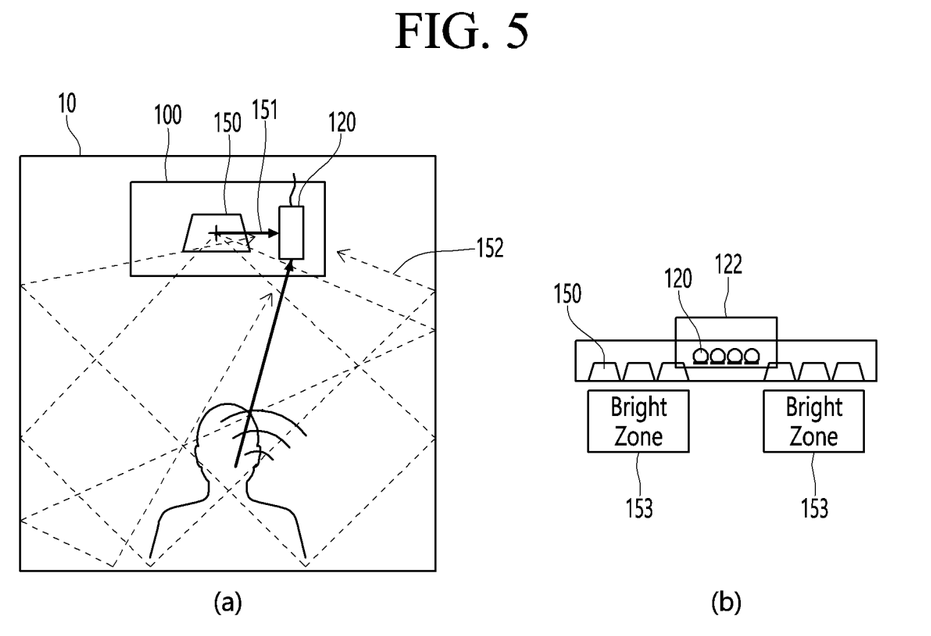
FIG. 5 is a diagram illustrating a direct sound and an indirect sound according to an embodiment of the present disclosure.

FIG. 5(*a*) is a diagram illustrating an example of a room space according to an embodiment of the present disclosure, and FIG. 5(*b*) is a diagram illustrating a sound field control apparatus according to an embodiment of the present disclosure.

Referring to FIGS. 5(*a*) and 5(*b*), the processor according to an embodiment of the present disclosure may set a dark zone 122 in which the direct sound output from the speaker array 120 is removed.

In this case, the dark zone 122 may be the specific area around the microphone described with reference to FIG. 4.

The direct sound 151 output from the output interface 150 may be noise-canceled in the dark zone.

For example, the processor 180 may design a filter of the microphone to receive a reference of voice data output from the output interface 150 and remove the reference.

In this case, the direct sound 151 may be transmitted to the user through the speaker array. An area in which the direct sound is output through the speaker array may be referred to as a bright zone 153.

In this case, the direct signal data may refer to the sound signal received by the microphone of the sound field control apparatus from the speaker through which the sound signal is output.

In addition, the indirect sound data 152 may refer to the sound signal received by the microphone of the sound field control apparatus from the output interface 150, from which sound is output, after being reflected by colliding against the wall of the space where the sound field control apparatus and the user exist.

On the other hand, in operation S300, the specific sound signal is recorded for each frequency band and the synthesized sound signal is first generated. However, it is also possible to generate the specific sound signal for each preset frequency band according to the configuration method of the algorithm, generate each indirect sound information of the space for each frequency band, synthesize the indirect sound information generated for each frequency band by using the synthesis filter, and generate the spatial characteristic information including the characteristics of the space.

Hereinafter, a method for generating and updating a transfer function based on a spatial model will be described with reference to FIG. 6.

After operation S300, when there is the utterance of the user, the processor 180 according to an embodiment of the present disclosure has to receive the utterance of the user through the corresponding voice recognition and provide the user with a response corresponding to the utterance of the user.

Therefore, operation S400 may be a process of generating a transfer function estimator based on a spatial model.

On the other hand, when the current user views content reproduced on the display device together with another user, the sound signal of the content being reproduced has to be transmitted to the other user, and the response of the voice assistant has to be provided to the user communicating with the voice assistant.

To this end, the transfer function based on the location on the space of the user communicating with the sound field control apparatus may be estimated (S400).

First, since the sound field control apparatus 100 according to an embodiment of the present disclosure has to determine the room impulse response of the location where the user is located in space, the processor 180 may infer the room impulse response of the location where the user is located in the space.

When the space is divided into grids, the impulse response filter is different for each grid. Therefore, the process of inferring the room impulse response may be a process of inferring the room impulse response corresponding to the impulse response filter.

First, the processor 180 according to an embodiment of the present disclosure may generate an initial model of a room impulse response serving as a reference in order to estimate a transfer function based on spatial modeling (S610).

Using a ratio of 'X signal', which is sound data measured in a space without indirect sound and reflection sound, such as in a laboratory, to 'Y signal', which is a user voice signal measured by a microphone in the space where a user and a sound field control apparatus are located, the processor 180 according to an embodiment of the present disclosure may extract the room impulse response and generate the initial model of the transfer function for each frequency band of the corresponding space.

In other words, the degree of deformation of the signal is checked by using the ratio of the 'X signal' to the 'Y signal'.

Thereafter, the processor 180 according to an embodiment of the present disclosure may perform an impedance boundary estimator (IBE) based on the ratio of the 'X signal' to the 'Y signal'.

Specifically, the IBE may be an algorithm for adjusting the reflection sound for each frequency band by comparing a rectangular specific spatial numerical model (a space where a rectangular grid is determined) and a returning voice signal reflected from the space.

For example, the initial model may be completed by measuring the degree of reflection of the sound signal in the space where the user is located for each frequency and finding the reflectance of the walls for each frequency band.

The initial model generation process may be the same as the room impulse response filter generation process of S300.

When the initial model of the room impulse response is generated through the above process, the processor 180 may update a room impulse response initial model based on the user utterance position (S620, S630, and S640).

This represents a process of updating the room impulse response filter with the user utterance signal, and may be a process of forming a spatial model based on a topology.

Specifically, the processor 180 may analyze a microphone signal of a user sound signal based on the initial model, may determine how much to transform the amplitude or phase of the sound signal to be transmitted to the user through the wall of the space for each frequency band, and may update the impedance boundary and reflect (update) the room impulse response filter.

More specifically, a transfer function model for each frequency band based on the user utterance position may be generated by extracting the room impulse response using a ratio of a 'first signal', which is the user voice data forming the initial model in operation S610, to a 'second signal', which is the user voice signal that the sound field control apparatus measures using the microphone after the reception of the 'first signal' (S620).

That is, the degree of deformation of the signal is checked using the ratio of the 'first signal' to the 'second signal'.

Thereafter, the processor 180 according to an embodiment of the present disclosure may perform an IBE based on the ratio of the 'first signal' to the 'second signal' and generate an updated room impulse response filter using a topology model (S640).

According to an embodiment, the room impulse response filter may have the same meaning as the transfer function.

Figure 7:
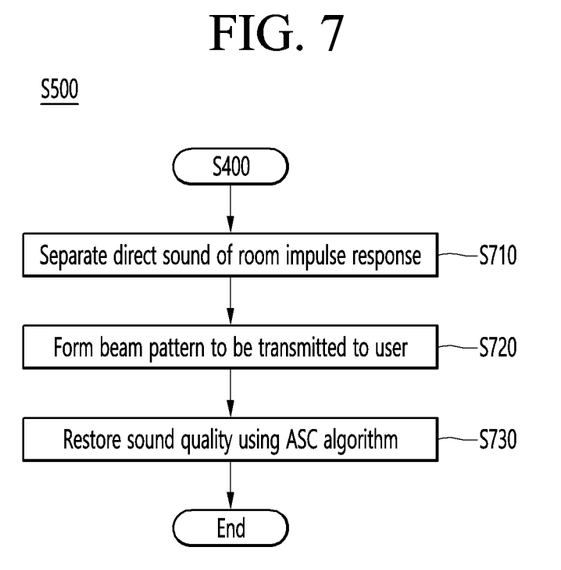
FIG. 7 is a flowchart according to an embodiment of the present disclosure.

Hereinafter, implementation of sound field technology to an individual user in operation S500 will be described with reference to FIG. 7.

When the room impulse response based on the user utterance position is known, the processor 180 according to an embodiment of the present disclosure may provide a personal sound field technology for individually transmitting sound data to the user.

That is, the sound field control apparatus may output the sound signal for transmitting the response to the user based on the room impulse response generated based on the location of the user.

In this case, the sound signal transmitted to the user may be a beam pattern, and the beam pattern may refer to a pattern for controlling a sound output from the output interface 150 so that a strong sound pressure is transmitted to a specific location.

First, the processor 180 according to an embodiment of the present disclosure may separate the direct sound of the room impulse response (S710).

Specifically, the power of the control space may be made uniform. The above process may be a process of extracting a path of a sound source directly transmitted from the output interface 150 to a location where the user is located.

Thereafter, the processor 180 may apply a beam forming filter to form a beam pattern to be transmitted to the user (S720).

On the other hand, sound quality transmitted from the output interface 150 may be damaged as a result of the beam forming.

In order to restore the damage of the sound quality, a direct to reverberant ratio (DRR) may be restored using an acoustic spatial control (ASC) algorithm, so that sound quality may not be damaged (S730).

More specifically, it is possible to provide the beam pattern with the optimal sound pressure difference to the location of the user by acquiring target response information given in the process of manufacturing the speaker (output interface) mounted on the processor 180 and comparing pieces of room impulse response information with each other.

In this case, the target response is output data set so that the speaker can exhibit optimal performance in a space where there is no reflection sound, such as in a laboratory.

Through the above process, the sound field control apparatus may provide an independent sound field to at least one user.

According to an embodiment of the present disclosure, since the sound field control apparatus performs control so that sound signals generated from the output interface are less transmitted to the location of the microphone, the voice assistant can accurately receive the command corresponding to a user's wake-up word command or utterance.

According to an embodiment of the present disclosure, the sound field control apparatus can independently transmit a variety of sound information to multiple users by using the room impulse response representing the characteristics of the space in which the users are located.

The present disclosure described above can be embodied as a computer-readable code on a medium on which a program is recorded. The computer-readable medium includes all types of recording devices that store data that can be read by a computer system. Examples of the computer-readable medium may include hard disk drive (HDD), solid state disk (SSD), silicon disk drives (SDD), ROM, RAM, CD-ROM, magnetic tape, floppy disk, optical data storage device, and the like. In addition, the computer may include the processor 180 of the terminal.

What is claimed is:

1. A sound field control apparatus comprising:
a microphone;
an output interface; and
one or more processors configured to:
for each preset band of a plurality of preset bands:
control the output interface to output a specific sound signal within the preset band; and
record the specific sound signal received at the microphone;
synthesize the recorded specific sound signals;
based on the synthesized specific sound signals, estimate indirect sound signals that are not input directly from the output interface to the microphone, but are input indirectly from the output interface to the microphone via a wall of a space in which the sound field control apparatus is located,
wherein each of the estimated indirect sound signals corresponds to a respective band of the plurality of preset bands;
based on the estimated indirect sound signals, generate a room impulse response filter that captures spatial characteristics of the space in which the sound field control apparatus is located;
receive a first sound signal at the microphone, the first sound signal corresponding to an utterance of a user;
remove, from the received first sound signal, a direct sound signal in a specific area around the microphone using the generated room impulse response filter, wherein the direct sound signal is input directly from the output interface to the microphone;
update the room impulse response filter based on a position of the user when the first sound signal was received; and
output a second sound signal for providing an independent sound field to the user based on the updated room impulse response filter.

2. The sound field control apparatus of claim 1, wherein the one or more processors are further configured to update the room impulse response filter based on a degree of deformation of a previous user utterance signal and a current user utterance signal received by the microphone.

3. The sound field control apparatus of claim 2, wherein the one or more processors are further configured to
extract a path, through which the second sound signal is output to the user, based on the room impulse response filter,
output a personal sound signal as the second sound signal, an amplitude and a phase of which are changed to correspond to the path, and
provide the independent sound field to the user.

4. The sound field control apparatus of claim 3, wherein the one or more processors are further configured to correct a damaged sound quality by using an acoustic spatial control (ASC) algorithm.

5. An operating method of a sound field control apparatus including a microphone and an output interface, the operating method comprising:
  for each preset band of a plurality of preset bands:
    controlling the output interface to output a specific sound signal within the preset band; and
    recording the specific sound signal received at the microphone;
  synthesizing the recorded specific sound signals;
  based on the synthesized specific sound signals, estimating indirect sound signals that are not input directly from the output interface to the microphone, but are input indirectly from the output interface to the microphone via a wall of a space in which the sound field control apparatus is located,
  wherein each of the estimated indirect sound signals corresponds to a respective band of the plurality of preset bands;
  based on the estimated indirect sound signals, generating a room impulse response filter that captures spatial characteristics of the space in which the sound field control apparatus is located;
  receiving a first sound signal at the microphone, the first sound signal corresponding to an utterance of a user;
  removing, from the received first sound signal, a direct sound signal in a specific area around the microphone using the generated room impulse response filter, wherein the direct sound signal is input directly from the output interface to the microphone;
  updating the room impulse response filter based on a position of the user when the first sound signal was received; and
  outputting a second sound signal for providing an independent sound field to the user based on the updated room impulse response filter.

6. The operating method of claim 5, wherein updating the room impulse response filter comprises updating the room impulse response filter based on a degree of deformation of a previous user utterance signal and a current user utterance signal received by the microphone.

7. The operating method of claim 5, wherein outputting the second sound signal comprises:
  extracting a path, through which the second sound signal is outputted to the user, based on the room impulse response filter,
  outputting a personal sound signal as the second sound signal, an amplitude and a phase of which are changed to correspond to the path, and
  providing the independent sound field to the user.

* * * * *